US006253433B1

(12) United States Patent
Barron

(10) Patent No.: US 6,253,433 B1
(45) Date of Patent: Jul. 3, 2001

(54) APPARATUS AND METHOD FOR INSCRIBING POSITIONING MARKS ON A RING BAND BASED ON A PATTERN OF LOCATING SCRIBE HOLES

(76) Inventor: Ronald E. Barron, 1805 Valcourt Dr., Richardson, TX (US) 75081

( * ) Notice: Subject to any disclaimer, the term of this patent is extended or adjusted under 35 U.S.C. 154(b) by 0 days.

(21) Appl. No.: 09/413,437

(22) Filed: Oct. 6, 1999

(51) Int. Cl.[7] .............................. B23P 5/00; A44C 27/00

(52) U.S. Cl. .......................... 29/10; 29/896.412; 33/613; 33/670; 83/879

(58) Field of Search ................................ 29/10, 896.412; 33/613, 626, 628, 640, 641, 666, 670, 673, 675; 83/879; 63/26–28

(56) References Cited

U.S. PATENT DOCUMENTS 1,671,341 * 5/1928 Brown .................................... 33/673
2,181,971 * 12/1939 Gaston .
2,238,580 * 4/1941 Campbell .
3,609,868 * 10/1971 Weglin .................................. 33/666

* cited by examiner

*Primary Examiner*—P. W. Echols
(74) *Attorney, Agent, or Firm*—Arthur I. Navarro

(57) ABSTRACT

An apparatus and method for efficiently inscribing positioning marks on a ring band, including a positioning plate having a pattern of scribe holes defined therein, wherein the pattern of scribe holes is arranged to permit a jeweler to inscribe positioning marks on a ring band based on a number of desired scribe locations chosen from the pattern of scribe holes. A positioning lever is centered above the positioning plate and includes a positioning needle for placement into a scribe hole chosen from among the pattern of scribe holes, and an angular marker for inscribing positioning marks on a ring band positioned below the positioning lever in a central location of the positioning plate. A ring band mount for maintaining the ring band rigidly in place while the angular marker is utilized to inscribe a positioning mark on the ring band. The ring band mount is also positioned at a central location of the positioning plate, thereby permitting a jeweler to accurately set jewelry on the ring band utilizing the positioning marks. In addition, a ring band etching assembly having four legs for supporting the ring band etching assembly is attached to the positioning plate.

15 Claims, 4 Drawing Sheets

APPARATUS AND METHOD FOR INSCRIBING POSITIONING MARKS ON A RING BAND BASED ON A PATTERN OF LOCATING SCRIBE HOLES

BACKGROUND OF THE INVENTION

1. Technical Field of the Invention

The present invention is related to apparatus and methods for setting jewelry on ring bands. In particular, the present invention relates to techniques for efficiently inscribing positioning marks on ring bands in order to assist jewelers in setting jewelry on the ring bands.

2. Description of the Related Art

It is a widely practiced custom throughout many areas of the world for women and men to wear ornamental jewelry. Typically, each ornament is singularly dedicated for use as only one type of jewelry piece. Jewelry may take a variety of different forms, and may either be worn directly attached to a wearer, as for example in the case of earrings, or it may be attached to a wearer's clothes by a fastening element such as a pin, or a broach which, in turn, may be attached to the lapel of a jacket worn by the user, or may be worn around a portion of the user, such as a bracelet, necklace, anklet, ring bands or even a belt. Although it is common to have a set of different, but matching jewelry pieces having some common characteristics, each of the different jewelry pieces in a set generally has its own ornament and is structurally and functionally independent from the other pieces in the set.

Jewelers specializing in designing ring bands are faced with a particularly daunting task when attempting to locate ornaments, such as diamonds or rubies, on a ring band. The jeweler must initially place positioning marks accurately on the ring band. Such positioning marks permit the jeweler to predetermine the location on the ring band where the ornaments will be placed. Jewelers must accurately place the ornaments on the ring band to properly manufacture the final product.

Jewelers presently rely upon guesswork and visual estimations to accurately place positioning marks on ring bands. Such manual locating techniques are plagued with improper visual estimations and "educated guesses," which ultimately results in a poor ring band product.

Based on the foregoing, it can be appreciated that what is needed to accurately place positioning marks on ring bands is a device that would permit a jeweler to accurately and efficiently place positioning marks on ring bands without the guesswork and rough visual estimations currently relied upon by jewelers. It is believed the present invention described herein solves this problem.

SUMMARY OF THE INVENTION

It is therefore one object of the present invention to provide an improved apparatus and method for setting jewelry on ring bands.

It is another object of the present invention to provide an apparatus and method for efficiently inscribing positioning marks on a ring band in order to assist jewelers in setting jewelry on the ring band.

It is yet another object of the present invention to provide an apparatus and method for efficiently inscribing positioning marks on a ring band based on a pattern of locating scribe holes.

The above and other objects are achieved as is now described. An apparatus and method for efficiently inscribing positioning marks on a ring band is disclosed herein, including a positioning plate having a pattern of scribe holes defined therein, wherein the pattern of scribe holes is arranged to permit a jeweler to inscribe positioning marks on a ring band based on a number of desired scribe locations chosen from the pattern of scribe holes. A positioning lever is centered above the positioning plate and includes a positioning needle for placement into a scribe hole chosen from among the pattern of scribe holes, and a marker for inscribing positioning marks on a ring band positioned below the positioning lever in a central location of the positioning plate.

A ring band mount for maintaining the ring band rigidly in place while the marker is utilized to inscribe a positioning mark on the ring band. The ring band mount is also positioned at a central location of the positioning plate, thereby permitting a jeweler to accurately set jewelry on the ring band utilizing the positioning marks. In addition, a ring band etching assembly is disclosed having legs for supporting the positioning plate.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
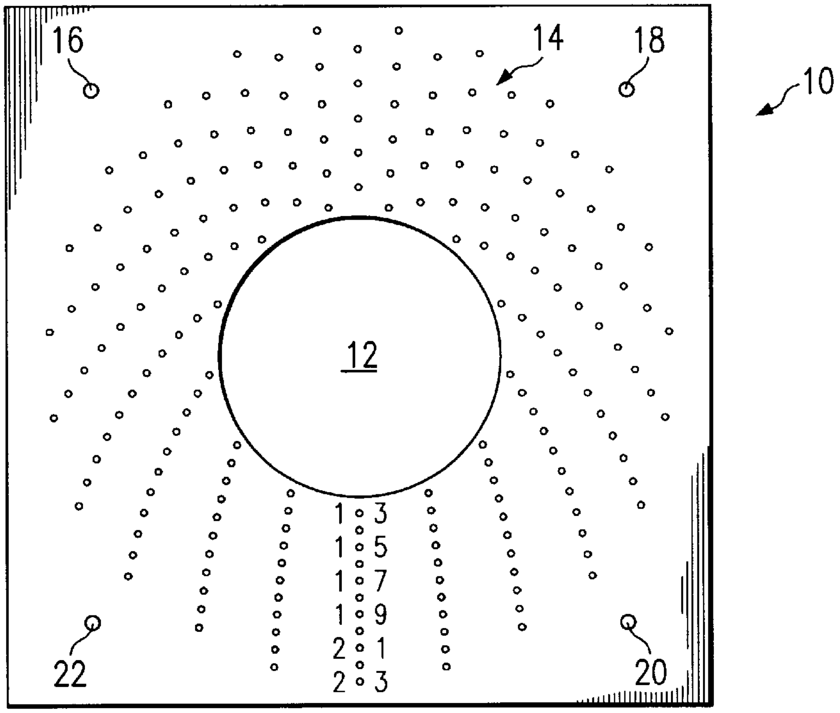
FIG. 1 illustrates a positioning plate having a pattern of locating scribe holes defined therein, in accordance with a preferred embodiment of the present invention.

With reference now to the figures and in particular with reference to FIG. 1, there is illustrated a positioning plate 10 having a pattern of locating scribe holes 14 defined therein, in accordance with a preferred embodiment of the present invention. Scribe holes 14 are spaced apart from one another in a manner that permits a thin pointed blade or other fine sharp object to fit within the space of each hole.

A circular opening 12 is maintained in a central position within positioning plate 10. Positioning plate 10 may be composed of a metallic material such as copper or bronze. However, those skilled in the art will appreciate that any number of other non-metallic materials may be utilized such as wood or plastic. Positioning plate 10 can be attached to a flat surface via screws that fit in holes 16, 18, 20, and 22.

Figure 2:
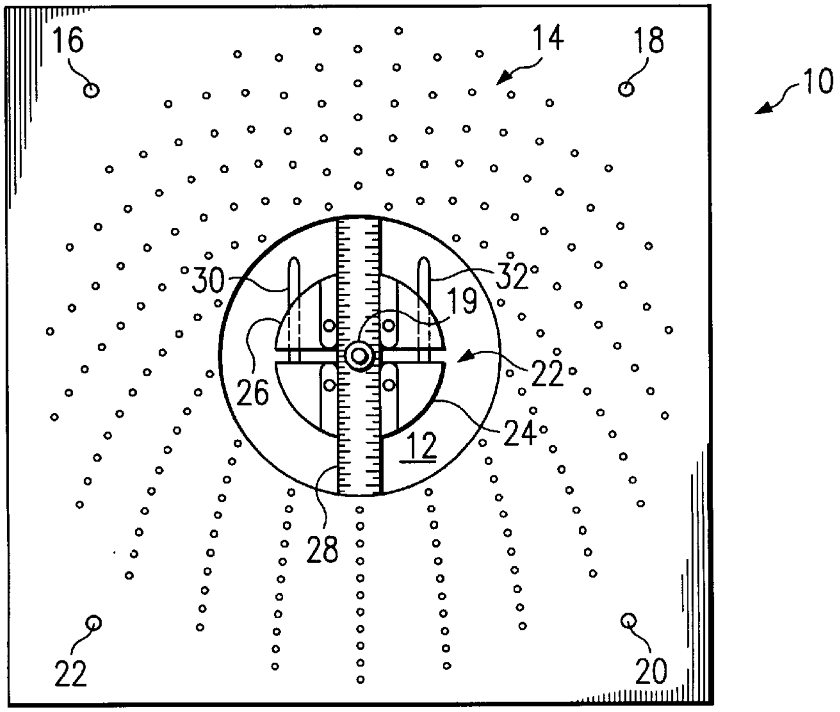
FIG. 2 depicts the positioning plate of FIG. 1 and a ring band mount, in accordance with a preferred embodiment of the present invention.

FIG. 2 depicts the positioning plate 10 of FIG. 1 and a ring band mount 22, in accordance with a preferred embodiment of the present invention. Ring band mount 22 is positioned immediately below positioning plate 10 within the area formed by circular opening 12. Ring band mount 22 is based on two semi-circular sections 24 and 26 upon which a ring band may be placed, although other configurations of the ring band mount 22 can be utilized as will be apparent to those of ordinary skill.

Two horizontal rods 30 and 32 are disposed within the confines of semicircular sections 24 and 26, and assist in moving semi-circular sections 24 and 26 away from or toward one another. A vertical closure post 19 is positioned at the center of ring band mount 22. As will be explained shortly, vertical closure post 19 assists in inscribing positioning marks on a ring band. Those skilled in the art will appreciate that in FIG. 1 to FIG. 7 illustrated herein, like parts are illustrated by like reference numerals.

Figure 3:
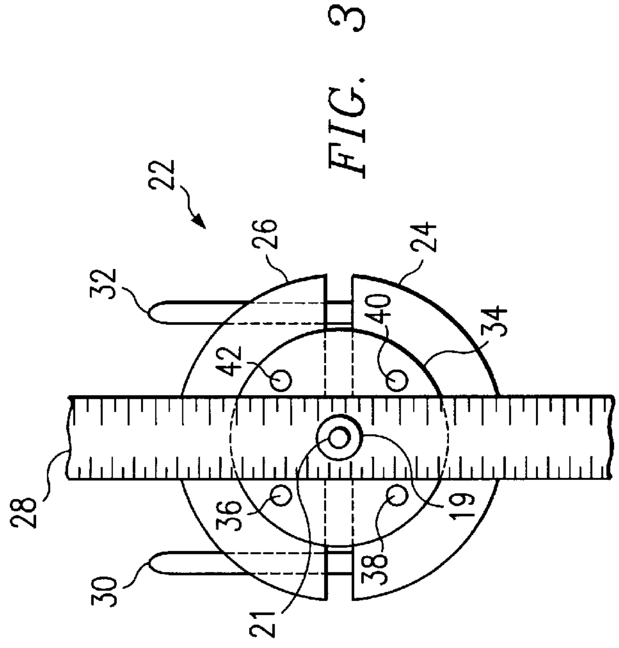
FIG. 3 illustrates the ring band mount of FIG. 2 in greater detail, in accordance with a preferred embodiment of the present invention.

FIG. 3 illustrates the ring band mount of FIG. 2 in greater detail, in accordance with a preferred embodiment of the present invention. If a jeweler wishes to inscribe positioning marks on a ring band 34, the jeweler places ring band 34 about posts 36, 38, 40 and 42. Posts 36 and 42 protrude from semi-circular section 26, while posts 38 and 40 protrude from semi-circular section 24. A screw 21 is positioned at the center of vertical closure post 19. Ring band 34 rests atop a flat surface formed by semi-circular sections 26 and 24.

Vertical closure post 19 and screw 21 thus extend upward through ring band 34. A guide 28 also forms a flat surface by contact with semi-circular sections 26 and 24. Thus, ring band 34 also sits atop guide 28. Guide 28 contains a measuring bar, which assists the jeweler in positioning ring band 34 properly atop the flat surface formed by semi-circular sections 26 and 24 and guide 28. Essentially, the guide 28 acts as a support arm to the semi-circular sections 24 and 26. Thus, by moving semi-circular sections 26 and 24 apart from one another, ring band 34 will become tightly fixed about posts 36, 42, 38 and 40.

Figure 4:
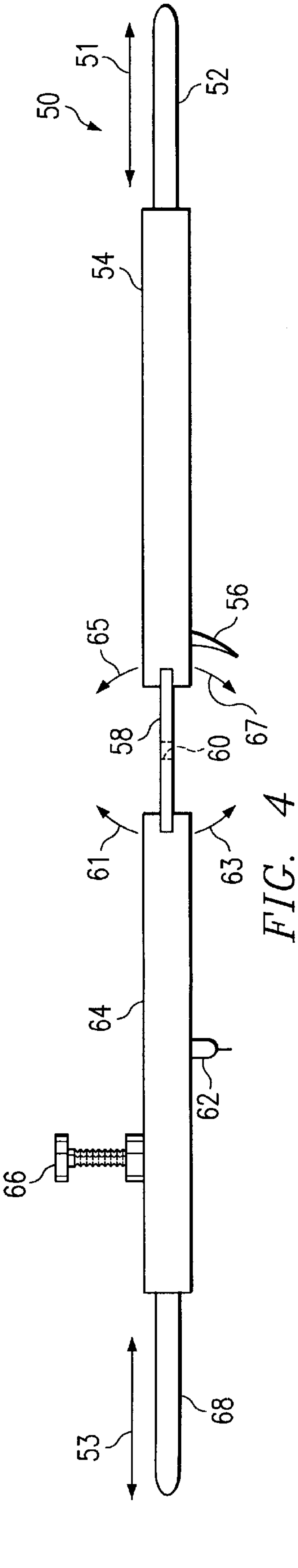
FIG. 4 depicts a positioning lever, in accordance with a preferred embodiment of the present invention.

FIG. 4 depicts a positioning lever 50, in accordance with a preferred embodiment of the present invention. Positioning lever 50 is composed of a first rod 52, a second rod 68 and a lever section 58. First rod 52 is maintained within first rod section 54, while second rod 68 is maintained within second rod section 64. First rod section 54 is separated from second rod section 64 by lever section 58. A hole 60 is located at the center of lever section 58 through which a screw, such as screw 21 of FIG. 3, may be positioned.

Arrow 51 indicates that first rod 52 may move out of or into a cavity (not shown) of first rod section 53. Arrow 53 indicates that second rod 68 may also move out of or into a cavity (not shown) of second rod section 64. Arrows 65 and 67 indicate the range of motion of first rod section 54 and first rod 52 about lever section 58. Arrows 61 and 63, on the other hand, indicate the range of motion of second rod section 64 and second rod 68 about lever section 58.

Angular marker 56 is attached to first rod 52. By moving first rod 52, the position of angular marker 56 along first rod section 54 can be adjusted. In a similar manner, by moving second rod 68, the position of positioning needle 62 can be also be adjusted due to the fact that positioning needle 62 is attached to second rod 68 within the cavity of second rod 64. A screw 66 can be utilized to hold second rod 68 tightly in place within the cavity of second rod 64. Positioning needle 62 is a sharp locating object that fits within scribe holes 14 of positioning plate 10 illustrated in FIG. 1 and FIG. 2 herein.

Figure 5:
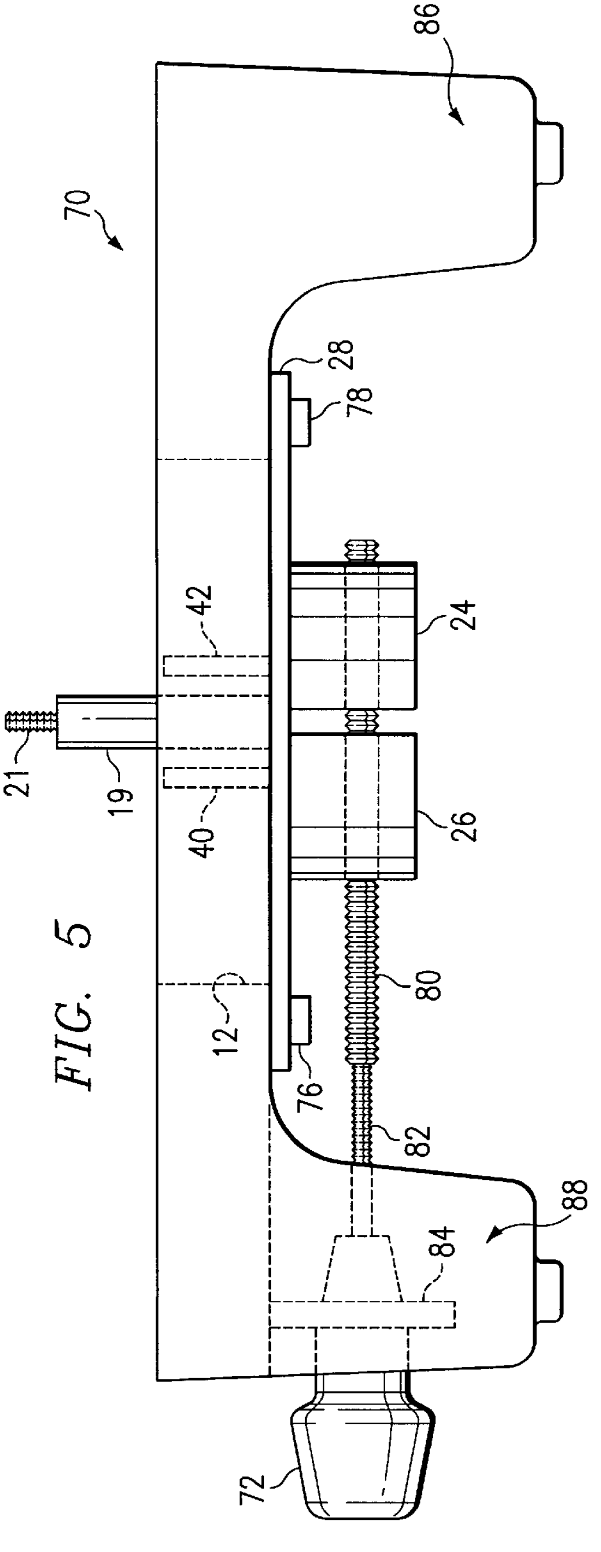
FIG. 5 illustrates a ring band etching assembly, in accordance with a preferred embodiment of the present invention.

FIG. 5 illustrates a ring band etching assembly 70, in accordance with a preferred embodiment of the present invention. Ring band etching assembly 70 includes legs 88 and 86. Although only legs 88 and 86 are illustrated in FIG. 5, those skilled in the art will appreciate that another set of legs are similarly located opposite legs 88 and 86. Thus, four (4) legs support ring band etching assembly 70 although it should be appreciated that the use of more or less legs in the assembly 70 as well as other supporting structure(s) is likewise contemplated. Guide 28, illustrated in FIG. 2 and FIG. 3 herein is attached to ring band etching assembly 70 by screws 76 and 78. Posts 40 and 42 are also illustrated in FIG. 5.

A knob 72 (shown partly in phantom) is attached by a vertical plate 84 (also shown in phantom), to a first screw section 82. Screw section 82 is similarly shown partially in phantom. First screw section 82 is connected to a second screw section 80, which protrudes through a central horizontal axis of semi-circular sections 26 and 24. Thus, those skilled in the art can appreciate that by rotating knob 72, first and second screw sections 82 and 80 are also respectively rotating, resulting in the movement of semi-circular sections 26 and 24 away from or toward one other, depending on the direction (i.e., clockwise or counterclockwise) that knob 72 is rotated. Knob 72, vertical plate 84, first screw section 82, second screw section 80 and the semi-circular sections 26 and 24 thus together make up a turning assembly. The turning assembly permits a jeweler to move semi-circular sections 26 and 24 toward or away from one another, thereby securing or loosening the ring band on the ring band mount.

Figure 6:
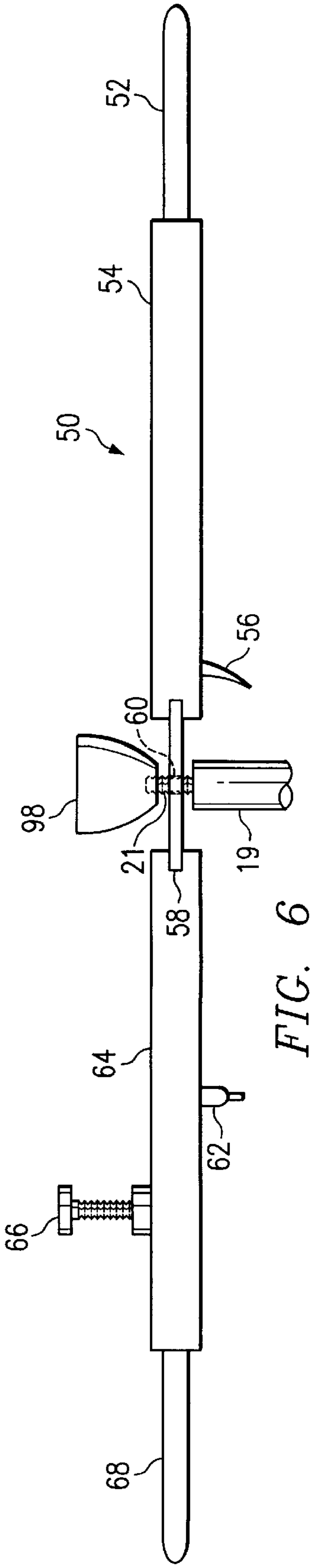
FIG. 6 depicts the positioning lever of FIG. 4 in greater detail, in accordance with a preferred embodiment of the present invention.

FIG. 6 depicts positioning lever 50 of FIG. 4 in greater detail, in accordance with a preferred embodiment of the present invention. In FIG. 6, positioning lever 50 is shown located above vertical closure post 19. Vertical closure post 19 is connected to screw 21, which fits through hole 60 of lever section 58. A cap 98 can be screwed onto screw 21 in order to maintain positioning lever 50 tightly above vertical closure post 90. Additionally, a washer (not shown) may be positioned on screw 21 prior to placing cap 98 into position on screw 21.

Figure 7:
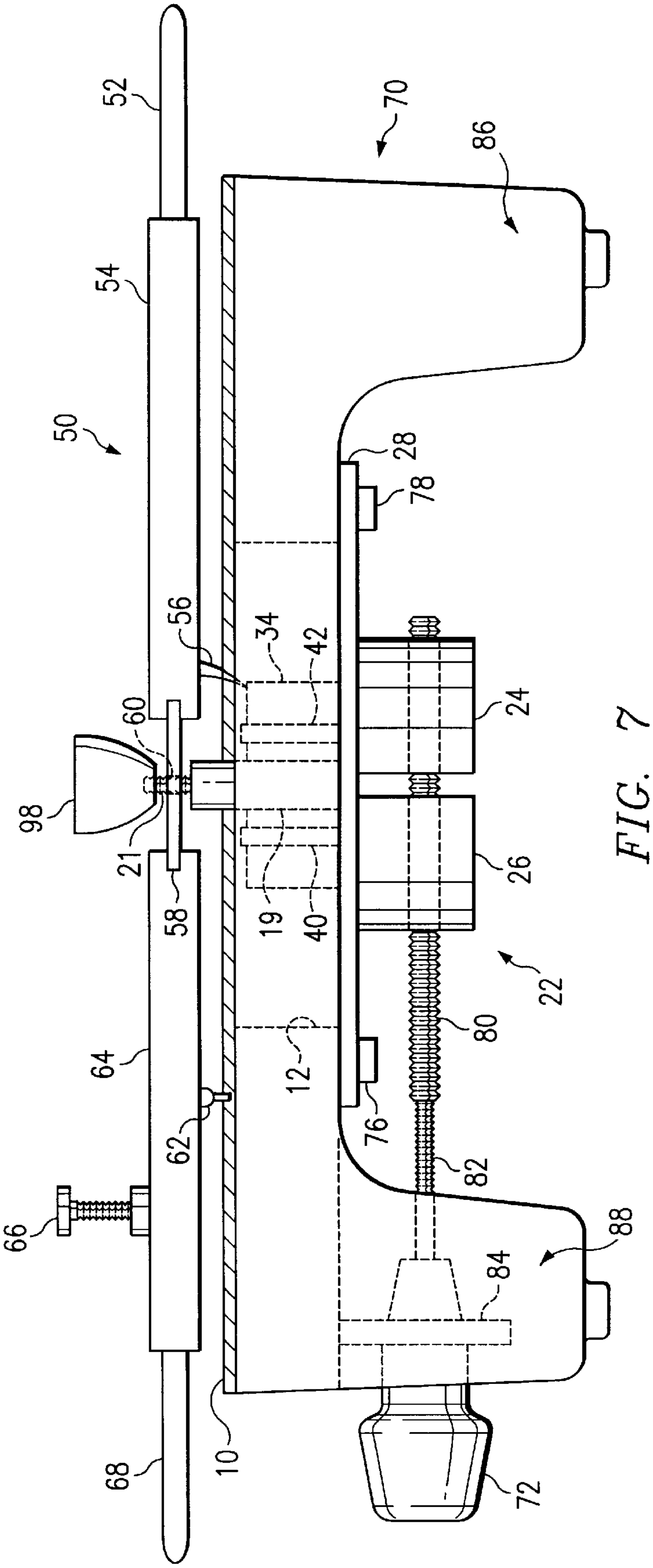
FIG. 7 illustrates a positioning lever, ring band mount, positioning plate, and ring band etching assembly, in accordance with a preferred embodiment of the present invention.

FIG. 7 illustrates positioning lever 50, ring band mount 22, positioning plate 10, and ring band etching assembly 70, in accordance with a preferred embodiment of the present invention. Based on the illustration depicted in FIG. 7, those skilled in the art will appreciate that positioning needle 62 may be placed within a scribe hole of positioning plate 10. Screw 66 can then be turned appropriately to lock positioning needle 62 temporarily at the desired scribe hole. Positioning needle 62 may be positioned at the desired scribe hole by moving second rod 68 left or right. Ring band 34 is held in place by posts 36, 38, 40 and 42. Only posts 40 and 42, however, are depicted in FIG. 7.

Referring to FIG. 1, a series of numbers are etched into positioning plate 10 in association with the pattern of locating scribe holes 14 defined therein. If a jeweler, for example, desires to etch five positioning marks equidistant from one another on ring band 34, the jeweler initially places positioning needle in the scribe hole labeled "15". When the positioning needle is firmly in place, the jeweler moves angular marker to a desired point on ring band 34 utilizing first rod 52 of positioning lever 50.

When the angular marker is positioned at the desired location on ring band 34, the jeweler merely presses down on first rod 52, thereby forcing angular marker into ring band 34, resulting in the inscription of a positioning mark on ring band 34. To make the next equidistant positioning mark on ring band 34, the jeweler lifts up second rod 68 and rotates the positioning lever to an appropriate scribe hole and repeats this procedure until all five positioning marks are inscribed on ring band 34.

When the positioning marks have been inscribed successfully on ring band 34, the jeweler is then free to remove cap 98 and positioning lever 50 from ring band etching assembly 70. After cap 98 and positioning lever 50 have been removed, knob 72 can be rotated appropriately so that semi-circular sections 26 and 24 are moved toward one another, thereby freeing ring band 34 for removal.

Based on the foregoing, it can be appreciated by those skilled in the art that the present invention presents a major advantage over present methods for etching positioning marks onto ring bands. Presently, jewelers must visually estimate where such positioning marks should be placed on the ring band. Such visual estimations are highly prone to error, resulting in an often poorly crafted final ring band product. By utilizing the pattern of scribe holes defined with the positioning plate described herein, a jeweler no long is forced to resort to "guesswork" and visual estimations when etching positioning marks on ring bands.

Those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An apparatus for efficiently inscribing positioning marks on a ring band, said apparatus comprising:

a positioning plate having a pattern of scribe holes defined therein, wherein said pattern of scribe holes is arranged to permit a jeweler to inscribe positioning marks on a ring band based on a number of desired scribe locations chosen from said pattern of scribe holes;

a positioning lever centered above said positioning plate, said positioning lever comprising:

a positioning needle for placement into a scribe hole chosen from among said pattern of scribe holes; and an angular marker for inscribing positioning marks on a ring band positioned below said positioning lever in a central location of said positioning plate; and a ring band mount for maintaining said ring band rigidly in place while said angular marker is utilized to inscribe a positioning mark on said ring band, said ring band mount positioned at said central location of said positioning plate, thereby permitting a jeweler to accurately set jewelry on said ring band utilizing said positioning marks.

2. The apparatus of claim 1 further comprising:

a ring band etching assembly having four legs for supporting said ring band etching assembly, said ring band etching assembly attached to said positioning plate.

3. The apparatus of claim 2 wherein said positioning lever further comprises:

a first rod section having a cavity therein, wherein a first rod is moveably located, said angular marker attached to said first rod;

a second rod section having a cavity therein, wherein a second rod is moveably located, said positioning needle attached to said second rod; and a lever section having a hole defined therein, wherein a screw attached to said ring band mount may be attached, said lever section located between and connected to said first rod section and said second rod section.

4. The apparatus of claim 3 wherein said ring band mount comprises:

a first semi-circular section moveably connected to a second semi-circular section; and a guide integrated with said first semi-circular section and said second semicircular section to compose a flat surface upon which said ring band may be placed and secured for inscription of positioning marks on said ring band by said angular marker.

5. The apparatus of claim 4 wherein said ring band mount further comprises:

four vertical posts about which said ring band is positioned for inscription of positioning marks of said ring band by said angular marker.

6. The apparatus of claim 5 further comprising:

a turning assembly for moving said first semi-circular section toward or away from said second semi-circular section, thereby respectively securing or loosening said ring band on said ring band mount.

7. The apparatus of claim 6 wherein said turning assembly comprises:

a knob attached to a vertical plate, said vertical plate connected to said ring band etching assembly;

a first screw section attached at one end of said first screw section to said knob through said vertical plate;

a second screw section attached at one end of said second screw section to another end of said first screw section, said second screw section integrated with said first semi-circular section and said second semi-circular section to permit the movement of said first and second semi-circular sections in response to a rotation of said knob in a particular direction.

8. The apparatus of claim 7 wherein said guide comprises at least one measuring bar having a plurality of measuring marks for assisting a jeweler in the placement of positioning marks on said ring band via said angular marker.

9. The apparatus of claim 8 wherein said ring band mount further comprises:

a vertical closure post positioned centrally within said ring band mount; and a screw protruding centrally from said vertical closure post for attachment to said positioning lever through said hole of said lever section.

10. The apparatus of claim 9 wherein said positioning plate comprises a plurality of numbers etched into said positioning plate in association with said pattern of scribe holes, thereby providing assistance to jewelers in inscribing a predetermined number of positioning marks on said ring band based on a number chosen from said plurality of numbers.

11. A method for inscribing positioning marks on a ring band, said method comprising the steps of:

placing said ring band on a ring band mount;

installing a positioning lever having first and second rods separated by a lever section over a vertical closure post;

inserting a positioning needle attached to said second rod into a specific positioning hole in a positioning plate; and inscribing a positioning mark onto said ring band by moving an angular marker attached to said first rod against said ring band.

12. The method of claim 11 wherein said inserting and inscribing steps are repeated until all required positioning marks are inscribed on said ring band.

13. The method of claim 11 wherein said step of placing said ring band on a ring band mount is followed by the step of adjusting said ring band mount to firmly hold said ring band.

14. The method of claim 11 wherein said inscribing step is followed by the step of removing said positioning lever.

15. The method of claim 11 wherein said inscribing step is followed by the step of removing said ring band from said ring band mount.

* * * * *